PLATED WIRE MEMORY ELEMENT

Filed Oct. 4, 1971

3 Sheets-Sheet 1

United States Patent Office 3,843,335

Patented Oct. 22, 1974

3,843,335

PLATED WIRE MEMORY ELEMENT

James O. Holmen, Minnetonka, Minn., assignor to Honeywell, Inc., Minneapolis, Minn.

Filed Oct. 4, 1971, Ser. No. 185,997

Int. Cl. B32b *15/00*

U.S. Cl. 29—194 11 Claims

ABSTRACT OF THE DISCLOSURE

A plated wire memory element having improved non-destructive readout (NDRO) properties comprises a non-magnetic wire substrate, a non-magnetic layer of controlled roughness over the substrate, a thin layer of cobalt, nickel, or iron over the non-magnetic layer, and a zero magnetostrictive layer of nickel-iron alloy over the thin layer.

BACKGROUND OF THE INVENTION

The present invention is directed to a plated wire magnetic memory element having improved non-destructive readout (NDRO) properties.

The ever increasing need for high capacity magnetic memories with non-destructive readout has led to an intensive research effort toward the use of thin films of magnetic material. This research has led to the development of the plated wire memory element, in which a non-magnetic wire substrate is overlayed with a coating of magnetic material. The coating is so formed that a high magnetic anisotropy is established which favors a selected orientation along the circumferential direction. Information is stored according to the sense of the circumferential magnetization in the plated wire. The two possible magnetization directions will hereafter be referred to as the "one" and the "zero" directions. To read out the stored information, ccurrent is applied to a word strap which runs orthogonal to, and envelops the plated wire. The current in the word strap produces the magnetic field along the axis of the plated wire. This field causes the magnetization vector to be displaced by some angle from its "one" or "zero" circumferential orientation, thereby causing a component of magnetization in the circumferential direction to decrease. This change causes a voltage to appear at the ends of the plated wire where it can be sensed. The amplitude of the word current is so controlled that the magnetization returns to its original position when the current is turned off. In this manner, non-destructive readout is achieved.

Typically, the plated wire consists of a non-magnetic wire substrate, a non-magnetic intermediate layer of controlled roughness which overlays the substrate, and a zero magnetostrictive magnetic layer of nickel-iron alloy. The wire substrate is commonly beryllium-copper or phosphor-bronze alloy wire and the intermediate layer is copper. Such prior art plated wire memory elements were desscribed by Richards et al. in "Topography Control of Plated Wire Memory Elements," *IEEE Transactions on Magnetics,* Volume MAG-4, No. 3, September 1968, and by Mathias and Fedde in "Plated Wire Technology: A Critical Review," *IEEE Transactions on Magnetics,* Volume MAG-5, No. 4, December 1969.

One problem which has been discovered in the prior art plated wires is a disturb phenomenon that is sensitive to the time of the first read pulse after writing and/or frequency of read pulses in the plated wire. This phenomenon has been termed the "Fast Burst Read Disturb" problem.

SUMMARY OF THE INVENTION

The plated wire memory element of the present invention has improved NDRO properties and disturb problems are minimized. The plated wire memory element comprises a non-magnetic wire substrate, a non-magnetic layer of controlled roughness overlaying the substrate, a thin layer of cobalt, nickel, iron, or magnetic alloys of these materials overlaying the magnetic layer, and a zero magnetostrictive magnetic layer of nickel-iron alloy overlaying the thin layer.

DESCRIPTION OF THE PREFERRED EMBODIMENTS

Figure 1:
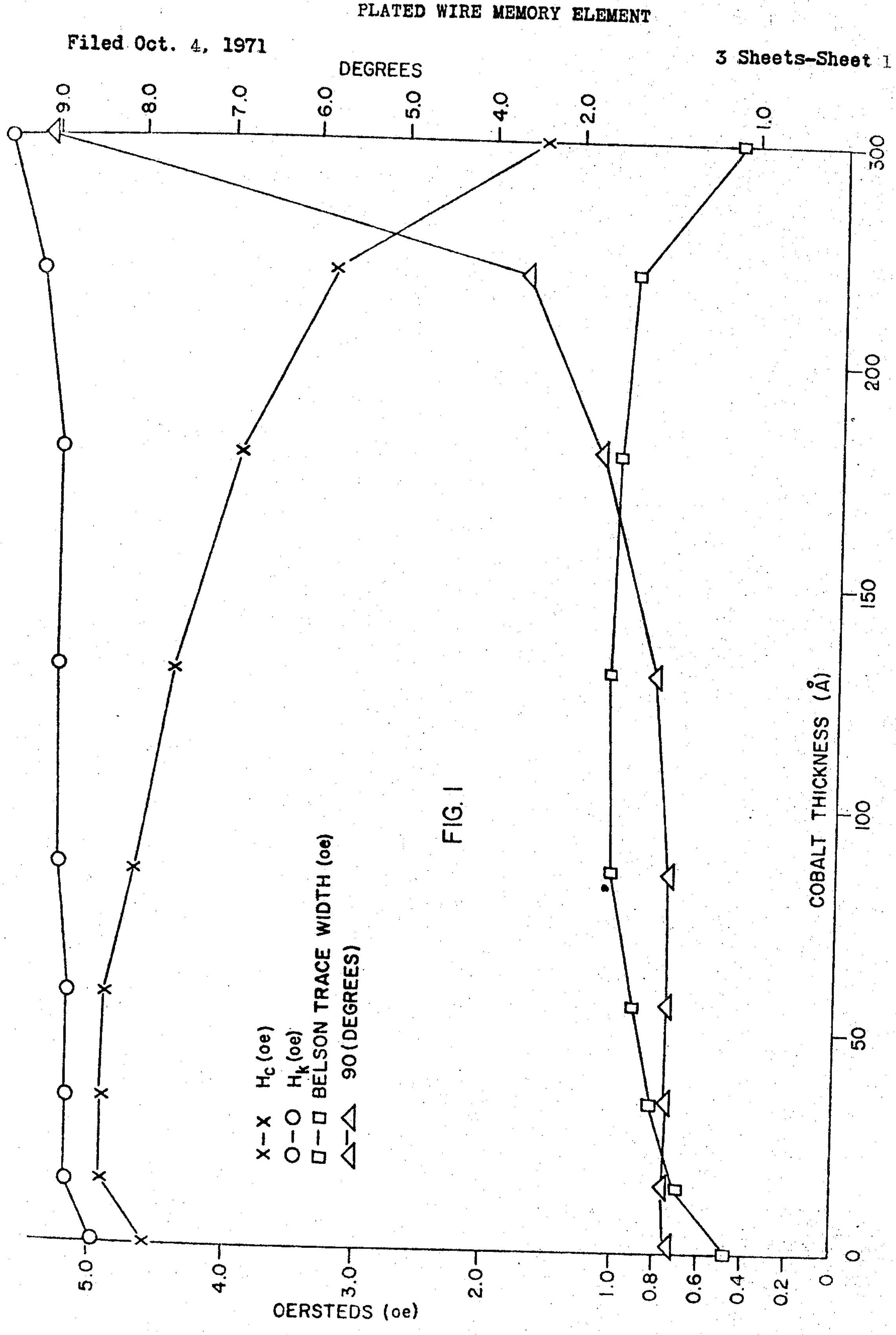
FIG. 1 shows various magnetic properties of a plated wire as a function of cobalt layer thickness.

The plated wire memory element of the present invention having improved NDRO properties utilizes a non-magnetic wire substrate which is preferably beryllium-copper or phosphor-bronze alloy having a diameter of between about 1 mil and about 10 mils. A non-magnetic layer of controlled roughness overlays the substrate. In the preferred embodiment this non-magnetic layer is copper having a thickness of between about $3\times10^3$ A. and about $20\times10^3$ A. This non-magnetic layer of controlled roughness is well-known in the art and although it is preferably copper, other materials such as gold may also be used. Overlaying the non-magnetic layer of controlled roughness is a thin layer of cobalt, nickel, iron, or magnetic alloys of these materials. When the layer is cobalt, the thickness is preferably between about 50 A. and about 300 A. For nickel the preferred range of thicknesses is between about 150 A. and about 700 A. and for iron the preferred range of thicknesses is between about 130 A. and about 1200 A. At the lower end of these ranges of thicknesses, the layer is in the form of discontinuous "islands" rather than in the form of a continuous deposit. Therefore, when discontinuous islands are utilized, the term "thickness" means the thickness of the layer assuming the same amount of material had been deposited in a continuous rather than discontinuous form. Overlaying the thin layer of cobalt, nickel or iron is a zero magnetostrictive layer of nickel-iron alloy having a preferred thickness of between about $3\times10^3$ A. and about $5\times10^3$ A.

It has been found that the thin layer underlying the zero magnetostrictive magnetic layer significantly enhances the NDRO properties of the plated wire and reduces the fast burst disturb problem. In particular, cobalt has been found most successful in achieving overall improvement in the properties of the plated wire. While this improvement is not understood, several possible effects acting individually or in concert may be the cause of the improvement. The improvement may be due in part to the development of a controlled roughness caused by the thin layer, thereby causing induced strain effects. It does appear, however, that at least part of the improvement is due to magnetic effects such as domain wall pinning. This tends to reduce creep effects and improve NDRO operation. As illustrative the effects to be attained through the use of the present invention the following examples are given.

EXAMPLE I

Beryllium-copper wire having a diameter of 5 mils was used as the non-magnetic substrate. The substrate was electro-polished and copper-plated by techniques well-known in the art. The copper layer of controlled roughness had a thickness of about $11\times10^3$ A.

Intermediate cobalt layers ranging in thickness from zero to 300 A. were then plated using the following bath conditions.

| | |
|---|---|
| $CoSO_4 \cdot 7H_2O$ | 390 grams/liter. |
| $H_3BO_3$ | 35 grams/liter. |
| $CoCl_2 \cdot 7H_2O$ | 2 grams/liter. |
| pH | 5.0. |
| Temp. | 40° C. |
| Anode | Stainless steel. |
| Plating current | <3 ma. |

A zero magnetostrictive nickel-iron alloy thin film having a thickness of about $9 \times 10^3$ A. was then electroplated on the wire. The wire was then annealed at approximately 400° C.

FIG. 1 shows the effects of a cobalt deposit on the coercive force $H_c$, the anisotropy field $H_k$, the easy axis dispersion $\alpha_{90}$, and the Belson hysteresis. It can be seen that as the cobalt deposit starts to become continuous, the magnetic properties begin to deteriorate. This change first starts to occur at about 100 A. As the thickness is increased from approximately 150 A., the dispersion $\alpha_{90}$ starts to increase and $H_c$ is reduced. At about 250 A., the properties drastically change—$H_c$ becomes very low. $H_k$ increases, $\alpha_{90}$ markedly increases and the Belson hysteresis once again is quite low. In addition, it has been found that the wire becomes badly skewed and a very high degree of bias is evident from a greatly shifted easy axis hysteresis loop.

Figure 2:
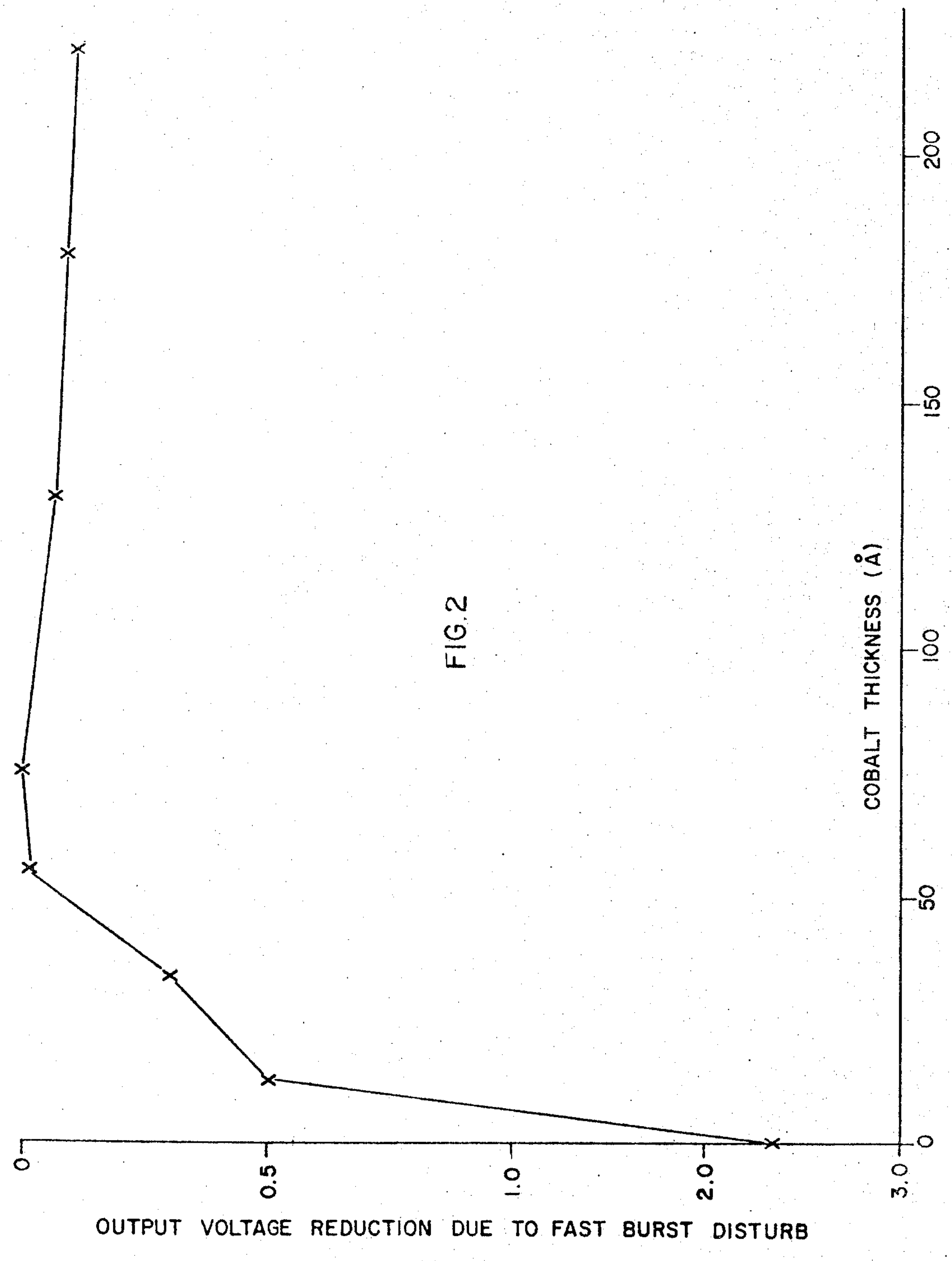
FIG. 2 shows the output voltage reduction due to fast burst disturb as a function of cobalt layer thickness.

FIG. 2 shows the voltage output reduction due to the short cycle disturb effect as a function of cobalt thickness. A pulse test was used in which write current levels were set at 450 and 32 milliamps. The read current was 600 milliamps and was established after a 200 nanosecond delay. The average non-disturbed voltage output level for the wires tested was about 10 millivolts. In the preferred thickness range of cobalt of between about 70 A. and about 130 A. the fast burst disturb effect is markedly reduced to close to zero.

It has been found that the unipolar digit disturb point increases as the cobalt thickness increases. The zero point also increases, but not at as great a rate as does the unipolar digit disturb (UPDD) threshold. For example, one set of wires having cobalt thickness of between zero and 200 A. showed an increase in the UPDD of about 20 milliamps over the range while the zero point increased by about 10 milliamps.

EXAMPLE II

Plated wire memory elements similar to those described in Example I were fabricated utilizing intermediate nickel layers rather than cobalt layers. Nickel layers ranging in thickness from zero to 800 A. were plated using the following bath conditions.

| | |
|---|---|
| $NiSO_4 \cdot 6H_2O$ | 324 grams/liter. |
| $H_3BO_3$ | 25 grams/liter. |
| $NiCl_2$ | 2 grams/liter. |
| pH | 3.0. |
| Temp. | 40° C. |
| Anode | Nickel. |
| Plating current | <12 ma. |

EXAMPLE III

Plated wire memory elements were fabricated according to the method described in Example I except that intermediate iron layers ranging in thickness from zero to about 1300 A. were utilized rather than intermediate cobalt layers. The iron layers were plated using the following bath conditions.

| | |
|---|---|
| $FeSO_4(NH_4)_2SO_4 \cdot 6H_2O$ | 320 grams/liter. |
| $H_2SO_4$ | 0.1–1.0 milliliter/liter |
| pH | 2.7. |
| Temp. | 30° C. |
| Anode | Stainless steel. |
| Plating current | <19 ma. |

Figure 3:
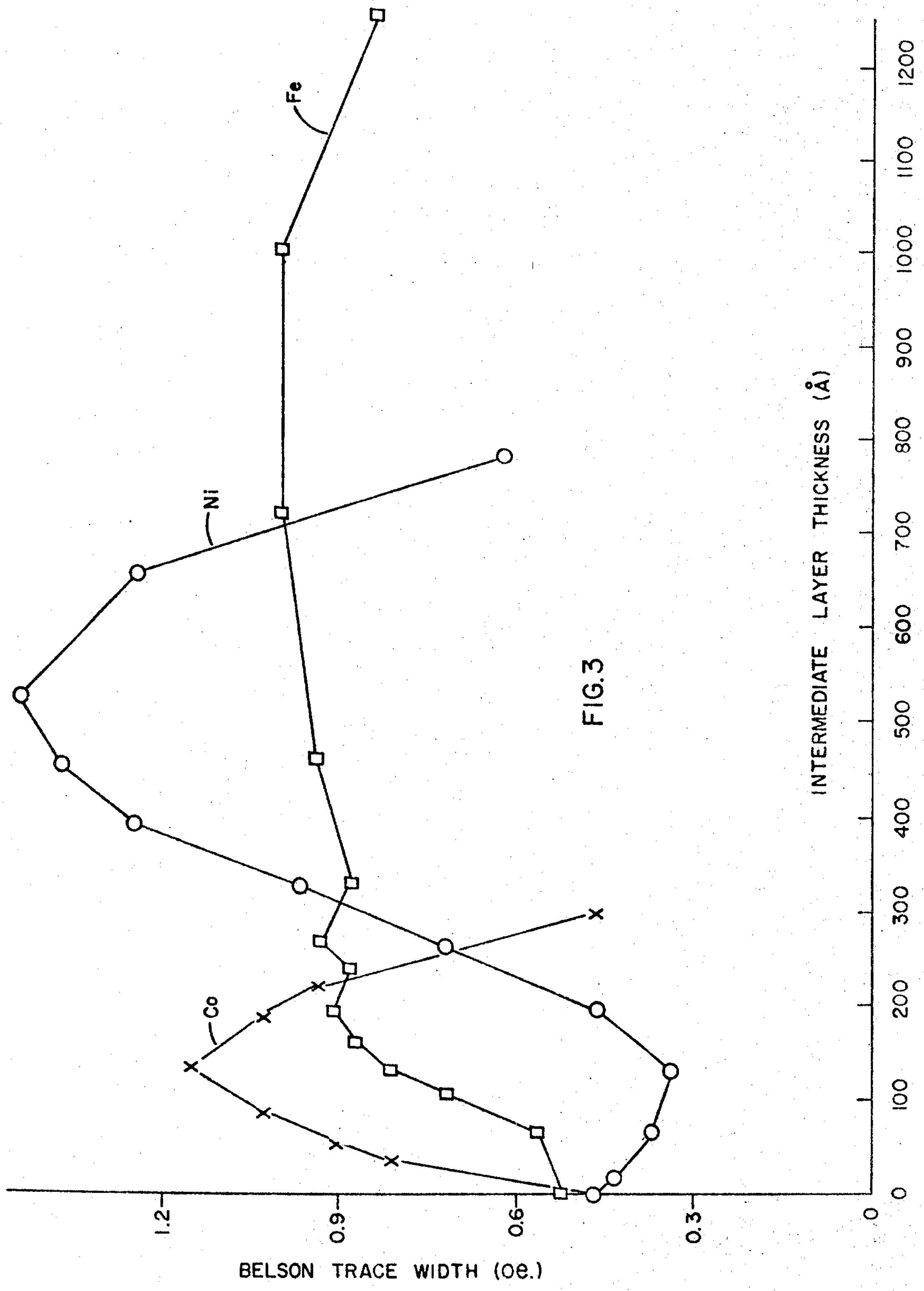
FIG. 3 shows Belson hysteresis as a function of thickness for cobalt, nickel, and iron layers.

FIG. 3 shows Belson hysteresis as a function of thickness for cobalt, nickel, and iron layers. It can be seen that these layers significantly improve the Belson hysteresis. It should be noted, however, that the use of nickel or iron has one significant disadvantage. Since the thin layer is in contact with the nickel-iron alloy layer, the intermediate nickel or iron layer may shift the overall composition of the alloy somewhat so that zero magnetostriction does not occur. On the other hand, cobalt does not shift the nickel-iron alloy off of zero magnetostriction. In addition, less cobalt is required to improve the NDRO properties of the wire. Therefore, cobalt is the preferred material for the thin magnetic layer.

It is to be understood that this invention has been disclosed with reference to a series of preferred embodiments and it is possible to make changes in form and detail without departing from the spirit and scope of the invention. In particular, the plating bath conditions described in the various examples are included for illustration purposes only. The skilled practitioner in the art of electroplating will recognize that a large variety of plating baths and bath conditions may be utilized.

The embodiments of the invention in which an exclusive property right is claimed are defined as follows:

1. A plated wire memory element comprising:
non-magnetic, metallic wire substrate,
a non-magnetic, metallic coating of controlled roughness deposited and on said substrate,
a thin, discontinuous layer of a material selected from the group consisting of cobalt, nickel and iron, and magnetic alloys thereof deposited atop and enhancing the roughness of said non-magnetic coating, and
a zero-magnetostrictive magnetic layer of nickel-iron alloy deposited atop said discontinuously coated non-magnetic, metallic coating.

2. The memory element of claim 1 wherein said discontinuous layer is cobalt.

3. The memory element of claim 2 wherein said discontinuous layer has an average thickness of between about 50 A. and about 300 A.

4. The memory element of claim 3 wherein said discontinuous layer has an average thickness of between about 70 A. and 130 A.

5. The memory element of claim 1 wherein the non-magnetic metallic wire substrate has a diameter of beween 1 mil and about 10 mils.

6. The memory element of claim 1 wherein the non-magnetic metallic wire substrate is formed from a beryllium-copper alloy.

7. The memory element of claim 1 wherein the non-magnetic metallic coating is copper.

8. The memory element of claim 7 wherein the non-magnetic layer has a thickness of between about $3 \times 10^3$ A. and about $20 \times 10^3$ A.

9. The memory element of claim 1 wherein the zero magnetostrictive magnetic layer has a thickness of between about $3 \times 10^3$ A. and about $15 \times 10^3$ A.

10. The memory element of claim 1 wherein discontinuous layer is nickel having an average thickness of beween about 150 A. and about 700 A.

11. The memory element of claim 1 wherein said discontinuous layer is iron having an average thickness of between about 130 A. and about 1200 A.

References Cited

UNITED STATES PATENTS

| | | | |
|---|---|---|---|
| 3,213,431 | 10/1965 | Kolk | 340—174 ZB |
| 3,551,903 | 9/1966 | Jack | 340—174 PW |
| 3,673,581 | 6/1972 | Nishida | 340—174 PW |
| 3,691,032 | 9/1972 | Luborsky | 340—174 PW |
| 3,451,793 | 6/1969 | Matsushita | 340—174 PW |
| 3,512,947 | 5/1970 | Alban | 29—196.6 |
| 3,403,010 | 9/1968 | McDonald | 29—196.3 |
| 3,555,169 | 1/1971 | Miller | 29—196.3 |
| 3,249,409 | 5/1966 | McCleod | 29—196.6 |
| 3,560,172 | 2/1971 | Kench | 29—196.3 |
| 3,531,783 | 9/1970 | Doyle | 29—199 |
| 3,594,290 | 7/1971 | Jostan | 29—199 |
| 3,679,381 | 7/1972 | Chessin | 29—199 |

HYLAND BIZOT, Primary Examiner

U.S. Cl. X.R.

29—193, 196, 199; 340—174